(12) United States Patent
Dann et al.

(10) Patent No.: US 9,907,129 B2
(45) Date of Patent: Feb. 27, 2018

(54) MULTIPLE LED STRING DIMMING CONTROL

(71) Applicant: Microchip Technology Incorporated, Chandler, AZ (US)

(72) Inventors: Jeffrey Dann, Marathon, NY (US); Scott Dearborn, Brackney, PA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/481,172

(22) Filed: Apr. 6, 2017

(65) Prior Publication Data

US 2017/0295618 A1    Oct. 12, 2017

Related U.S. Application Data

(60) Provisional application No. 62/319,494, filed on Apr. 7, 2016.

(51) Int. Cl.
*H05B 33/08* (2006.01)

(52) U.S. Cl.
CPC ....... *H05B 33/0815* (2013.01); *H05B 33/083* (2013.01)

(58) Field of Classification Search
CPC .... H05B 33/02; H05B 33/08; H05B 33/0815; H05B 33/083; H05B 37/02
See application file for complete search history.

(56) References Cited

U.S. PATENT DOCUMENTS

| | | | | |
|---|---|---|---|---|
| 2008/0203946 A1* | 8/2008 | Ito | .......... | H05B 33/083 315/307 |
| 2010/0164403 A1* | 7/2010 | Liu | .......... | H05B 33/086 315/297 |
| 2010/0283322 A1* | 11/2010 | Wibben | .......... | H02M 3/158 307/31 |
| 2012/0025722 A1* | 2/2012 | Mokry | .......... | H05B 33/0827 315/187 |
| 2013/0119875 A1* | 5/2013 | Dearborn | .......... | H05B 33/0815 315/186 |
| 2014/0062322 A1* | 3/2014 | Yu | .......... | H05B 33/0815 315/200 R |
| 2014/0128941 A1* | 5/2014 | Williams | .......... | A61N 5/06 607/88 |
| 2015/0189706 A1 | 7/2015 | Yang | .......... | 315/224 |
| 2015/0312983 A1* | 10/2015 | Hu | .......... | F21K 9/1355 315/186 |

OTHER PUBLICATIONS

International Search Report and Written Opinion, Application No. PCT/US2017/026495, 12 pages, dated Jul. 21, 2017.

* cited by examiner

*Primary Examiner* — Jason M Crawford

(74) *Attorney, Agent, or Firm* — Slayden Grubert Beard PLLC

(57) ABSTRACT

An integrated circuit device is configured to drive multiple LED strings. The device includes a switch mode power supply control circuit configured to generate primary and secondary power transistor control signals and receive at least one current sense signal and an output voltage sense signal. The device also includes an output compare circuit configured to generate a plurality of pulse width modulated signals and a logic circuit configured to generate signals for selecting a reference voltage and for activating an absorber mode. The signal for activating an absorber mode is to be shared with the secondary power transistor control signal. The logic circuit is to be synchronized with the output compare module.

20 Claims, 4 Drawing Sheets

MULTIPLE LED STRING DIMMING CONTROL

RELATED PATENT APPLICATION

This application claims priority to commonly owned U.S. Provisional Patent Application No. 62/319,494; filed Apr. 7, 2016; which is hereby incorporated by reference herein for all purposes.

TECHNICAL FIELD

The present disclosure relates to LED technology, and, in particular, to multiple LED string dimming control.

BACKGROUND

LEDs have different applications, including use in automotive applications. Driving multiple strings of LEDs may be performed from a single output power train. In such cases, the strings may be driven through pulse width modulation (PWM). The current may is regulated to produced proper LED illumination. The strings may be driven in a cyclical manner referred to as a dimming cycle. LEDs might be used within an automobile to illuminate displays, the cabin, daytime running lights, or other external or internal portions of the automobile.

SUMMARY

Figure 1:
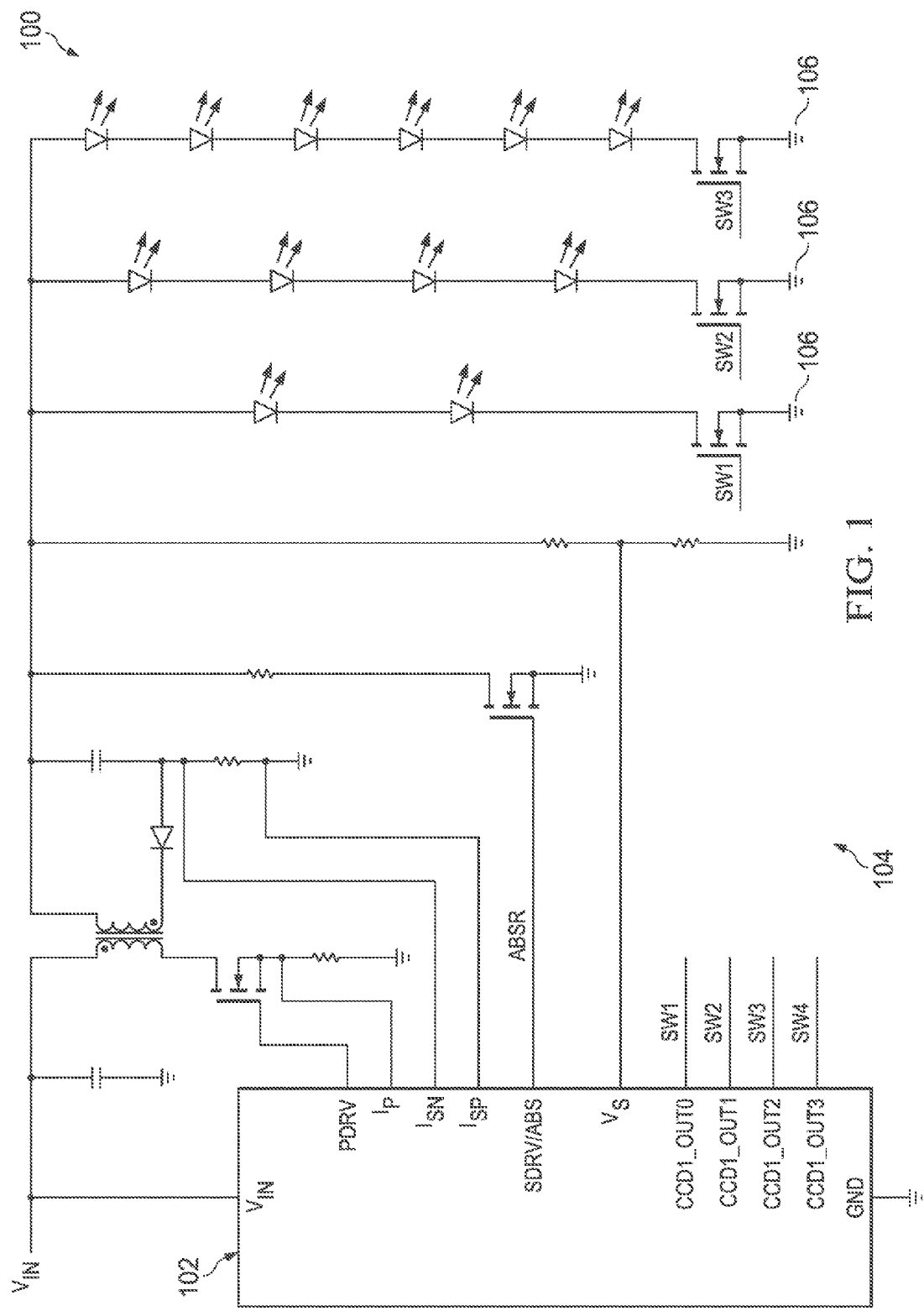
FIG. 1 is an illustration of a system for performing multiple LED string dimming control, according to embodiments of the present disclosure.

Embodiments of the present disclosure include an integrated circuit device configured to drive multiple LED strings. The device may include a switch mode power supply (SMPS) control circuit configured to generate primary and secondary power transistor control signals and receive at least one current sense signal and an output voltage sense signal. In combination with any of the above embodiments, the device may include an output compare circuit configured to generate a plurality of pulse width modulated signals. In combination with any of the above embodiments, the device may include a logic circuit configured to generate signals for selecting a reference voltage and for activating an absorber mode. In combination with any of the above embodiments, the signal for activating an absorber mode is configured to be shared with the secondary power transistor control signal. In combination with any of the above embodiments, the logic circuit is configured to be synchronized with the output compare module. In combination with any of the above embodiments, the signal for activating an absorber mode overwrites the secondary power transistor control signal. In combination with any of the above embodiments, the device may include a digital to analog converter configured to receive the signals for selecting the reference voltage. In combination with any of the above embodiments, the SMPS control circuit is further configured to generate the primary and secondary power transistor control signals to reposition voltage during a portion of a dimming cycle of the LED strings in which the LED strings are turned off. In combination with any of the above embodiments, the SMPS control circuit is further configured to generate the primary and secondary power transistor control signals to reposition voltage to a voltage level matching a voltage of a next LED string to be activated during a portion of a dimming cycle of the LED strings in which the LED strings are turned off. In combination with any of the above embodiments, the SMPS control circuit is further configured to generate the primary and secondary power transistor control signals to absorb voltage to lower output voltage to a voltage level matching a voltage of a next LED string to be activated during a portion of a dimming cycle of the LED strings in which the LED strings are turned off. In combination with any of the above embodiments, the SMPS control circuit is further configured to generate the primary and secondary power transistor control signals to absorb or reposition output voltage during a portion of a dimming cycle of the LED strings in which the LED strings are turned off based upon the logic circuit. In combination with any of the above embodiments, the logic circuit is further configured to alternately select the reference voltage from a overprotection voltage value and a candidate LED string voltage value, the candidate LED string voltage value corresponds to a next LED string voltage to be powered during a dimming cycle. In combination with any of the above embodiments, during a dimming cycle the logic circuit is further configured to alternately select the reference voltage from an overprotection voltage value and from a plurality of LED string voltages.

Embodiments of the present disclosure may include systems to drive multiple LED strings. The systems may include the contents of any of the integrated circuit devices from above. In combination with any of the above embodiments, the systems may include a SMPS circuit coupled with the SMPS control circuit, the SMPS circuit comprising a primary filed effect transistor and a secondary field effect transistor that couples a shunt resistor connected with the output voltage of the SMPS circuit with ground. In combination with any of the above embodiments, the systems may include a plurality of LED strings coupled with an output of the SMPS circuit. In combination with any of the above embodiments, the systems may include field effect transistors each associated with one of the LED strings and controlled by one of the plurality of pulse width modulated signals.

Embodiments of the present disclosure may include methods performed by the integrated circuit devices or systems above, the steps of which include the operations of the described embodiments.

DETAILED DESCRIPTION

FIG. 1 is an illustration of a system 100 for performing multiple LED string dimming control, according to embodiments of the present disclosure. In one embodiment, system 100 may utilize precise timing and control of output voltage and current to perform dimming control.

System 100 may address timing requirements for driving multiple LED strings 106. ON/OFF times when driving LED strings 106 may need to be controlled with tightly defined timing requirements. In some cases, firmware-based timing might not be adequate to meet LED PWM current accuracy requirements. Hardware-based timing, discussed in more detail below, may address this issue. Furthermore, system 100 may manage current regulation for different LED strings wherein each string requires a significantly different amount of voltage when compared to other strings. Since interrupt driven schemes vary in timing, system 100 may implement a synchronized scheme of controlling LED pulsing. When switching between different LED strings, often with large differences in forward voltage, system 100 may perform fast responsive current regulation without the presence of tail currents.

System 100 may be configured to set its power train output voltage to LEDs 106 pre-positioned to the level of LED forward voltage prior to driving current energizing the LEDs. This can be accomplished differently for synchronous and asynchronous systems. To reposition output voltage up, synchronous and asynchronous switching power supplies may disable the secondary drive and pulse the primary drive, adding energy to the converter increasing the output voltage until the desired level is reached. If the output voltage needs to be repositioned down, synchronous power supplies can pulse the secondary drive. Such methods are detailed in US Patent Application Publication US 2013/0119875, which is hereby incorporated by reference in its entirety. Asynchronous power supplies can reposition the output voltage DOWN by disabling the primary and pulsing a load at the output discharging the output capacitance until the desired output voltage is achieved. When the control transitions from voltage regulation (output voltage positioning) to current regulation (LED energization) the output control needs a mechanism of output over voltage protection in the event of an open load fault. System 100 may provide such a mechanism.

In one embodiment, system 100 may be configured to utilize synchronization from precise output compare timing to control multiple LED strings. In another embodiment, system 100 may be configured to perform absorption control to discharge output capacitance. In yet another embodiment, system 100 may be configured to perform voltage reference control to switch from a voltage regulation set point to an over voltage fault protection set point.

System 100 may include a closed loop switch mode power supply capable of regulating voltage or current. System 100 may include such a controller 102 that can use precise compare module timing to synchronize the switching between LED strings 106 with switching between voltage regulation and current regulation in addition to absorption control to discharge output capacitance. Separate independently controlled outputs from controller 102 may determine which LED string 106 is conducting current during the dimming cycle. Each LED string 106 in the dimming cycle can have different forward voltages, but yet controller 102 may regulate each string the same or different current levels. Controller 102 may be configured to reposition the output voltage between forward conduction cycles of each LED string 106 such that the voltage is at a regulated level conducive to a smooth current transition when the next LED string 106 is energized. This may create blocks of LED dimming current as well as the prevention of overshoot and tail currents. Current overshoots and tail currents may lead to increased LED heating, reduced lifespans, and cause color shifting. Controller 102 may achieve output voltage repositioning in both synchronous and asynchronous modes. Furthermore, controller 102 may perform automatic switches, in a synchronized manner, between voltage regulation set points for various LED strings 106 that are used to reposition output voltage between LED forward conduction times and an over-voltage protection set point used while regulating current through a conducting LED string.

Asynchronous output voltage repositioning may be achieved by using synchronous drive output that is reconfigured during asynchronous dimming operation to drive a switch connecting a load (such as a resistor) to the output of controller 102 during the off time between strings. Thus, the load resistor may dissipate the energy from the output capacitance. This may constitute the voltage regulation portion of the dimming cycle when changing the output voltage from a higher level to a lower level voltage.

Controller 102 may use precise compare timing to trigger switching multiple outputs, trigger changing the voltage regulation set point and trigger an absorber output as desired through configurable parameters as shown below.

Controller 102 may be implemented in any suitable manner. Controller 102 may be implemented by analog circuitry, digital circuitry, instructions on a memory for execution by a processor, or any suitable combination thereof.

Controller 102 may be arranged in FIG. 1 in an asynchronous flyback multi-LED string configuration. In the example of FIG. 1, three LED strings 106 are shown. However, any suitable number and kind of LED strings 106 may be used. Furthermore, each of LED strings 106 may include a different load, manifested, for example, by a different number of LEDs. Consequently, each of the LED strings 106 may be provided with different forward voltages. Each LED string may be switched with a corresponding switch from output of controller 102. Moreover, controller 102 may be connected to LEDs 106 through driver circuitry 104. Driver circuitry 104 may include any suitable analog or digital circuitry to provide power to LEDs 106 according to the teachings of this disclosure.

Controller 102 may include input terminals for voltage. Controller 102 may include an output terminal PDRV to MOS FET switches in circuitry 104. Controller 102 may include an Ip input terminal to sense primary current. Controller 102 may include an Isn input terminal to sense secondary current. Controller 102 may include an Isp terminal as a corresponding differential of the Isn terminal. Controller 102 may include a secondary drive terminal such as SDRV/ABS. This terminal may be secondary to the primary drive terminal, PDRV. In a synchronized flyback configuration, such a drive might drive a FET. However, in one embodiment, SDRV/ABS may be configured to perform the absorber function of controller 102. Output capacity may be discharged to an output voltage level that controller 102 is trying to regulate or achieve. For example, when switching between a given LED string to another LED string, when the other LED string has a lower forward voltage than the first LED string, the excess voltage may be absorbed through SDRV/ABS and its connected circuitry to step down the voltage. Controller 102 may include a Vs input to receive voltage feedback to sense the output voltage. In some cases, Vs may be capable of receiving a feedback current. Controller 102 may include a dual capture compare circuit (CCD). The CCD circuit may be configured to receive input data, which is captured and compared, and produce output data representing the output of comparison. The CCD circuit may be used for timing and control. For example, when desired timing matches the present timer value, then output may be gated according to the configuration of the CCD circuit and system 100 according to the PWM requirements of the particular application. In FIG. 1, controller 102 may include output pins SW1-SW4 for CCD circuit output. These may be connected to enable switches on various LED strings 106.

Figure 2:
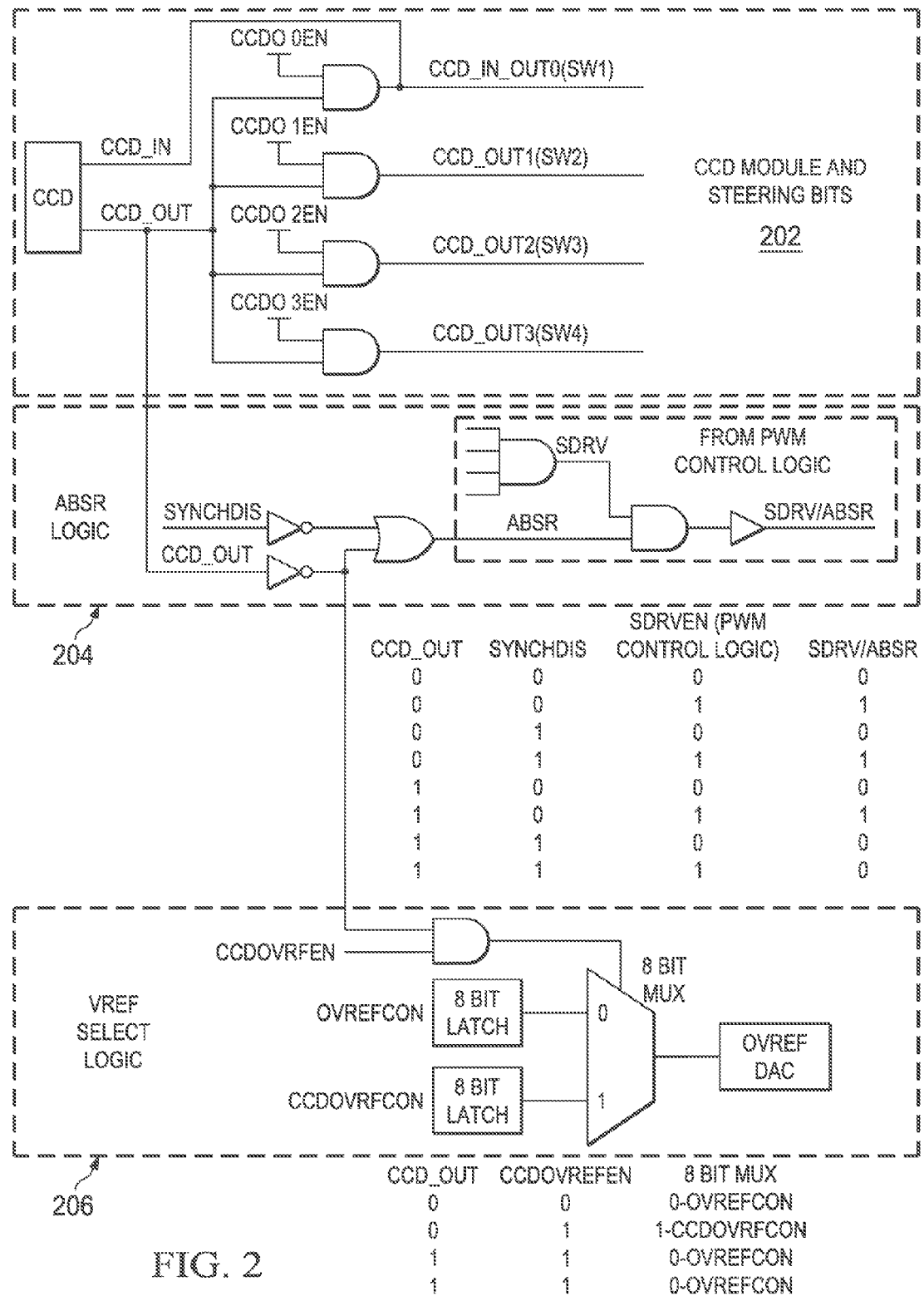
FIG. 2 illustrates a more detailed view of portions of a supply, according to embodiments of the present disclosure.

FIG. 2 illustrates a more detailed view of portions of controller 102, according to embodiments of the present disclosure. In particular, FIG. 2 illustrates a CCD circuit or module with steering bits 202, ABSR (absorber) logic 204, and VREF (voltage reference) select logic 206. A CCD circuit may receive feedback from output and may otherwise be configured to generate timing signals according to a PWM scheme when a timer internal to the CCD circuit reaches certain intervals. The signals may be output to the rest of steering bits and on to ABSR logic 204. The ABSR logic 204 may drive the output of the SDRV/ABS terminal of controller 102. A version of the CCD circuit output (such as an inverted signal) may be issued to VREF select logic 206, which may be configured to select which voltage reference will be used by controller 102. Such a selection may allow controller 102 to perform the steps up or down in voltage as needed to power specific ones of LED strings 106.

Figure 3:
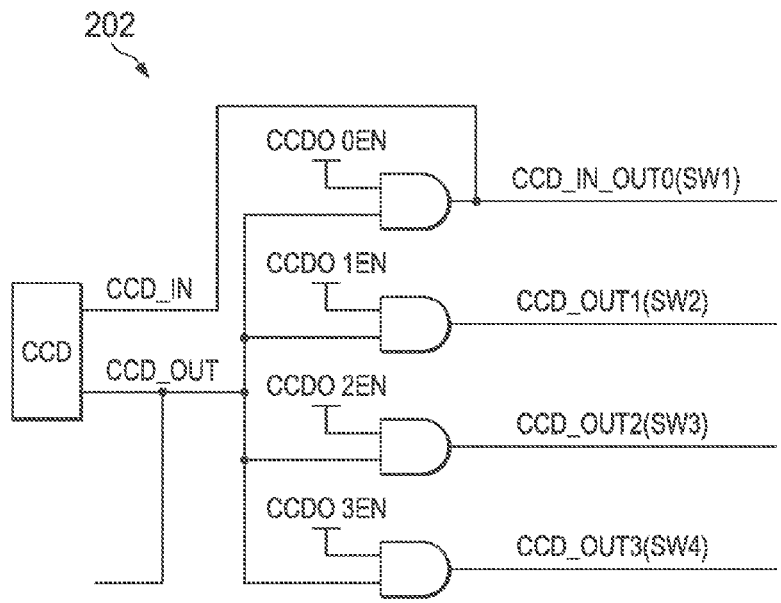
FIG. 3 illustrates a more detailed view of a Capture Compare Dual Module (CCD) circuit and steering bits, according to embodiments of the present disclosure.

FIG. 3 illustrates a more detailed view of CCD circuit and steering bits 202, according to embodiments of the present disclosure. These may be the initial building block or engine for controller 102 to perform multiple output control to target multiple LED strings 106. The CCD circuit may allow independent control of multiple general purpose input/output (GPIO) ports. For example, each of the GPIO ports may be configured as outputs and may be used to control switches SW1-SW3 in LED strings 106. The control may be performed according to a PWM scheme to deliver an appropriate dimming cycle to various SW1-SW3 in LED strings 106 with a corresponding duty cycle. Furthermore, in one embodiment the CCD circuit output may be used to identify whether a comparison has been made as a triggering mechanism to control functions downstream from this initial block. The CCD output may be generated whenever timing conditions are met (such as a particular period of time is reached). Moreover, the CCD output may be generated according to comparisons against the CCD input. Specific outputs of the CCD circuit may be enabled or disabled with register values, against which the CCD output is compared in an AND gate.

Figure 4:
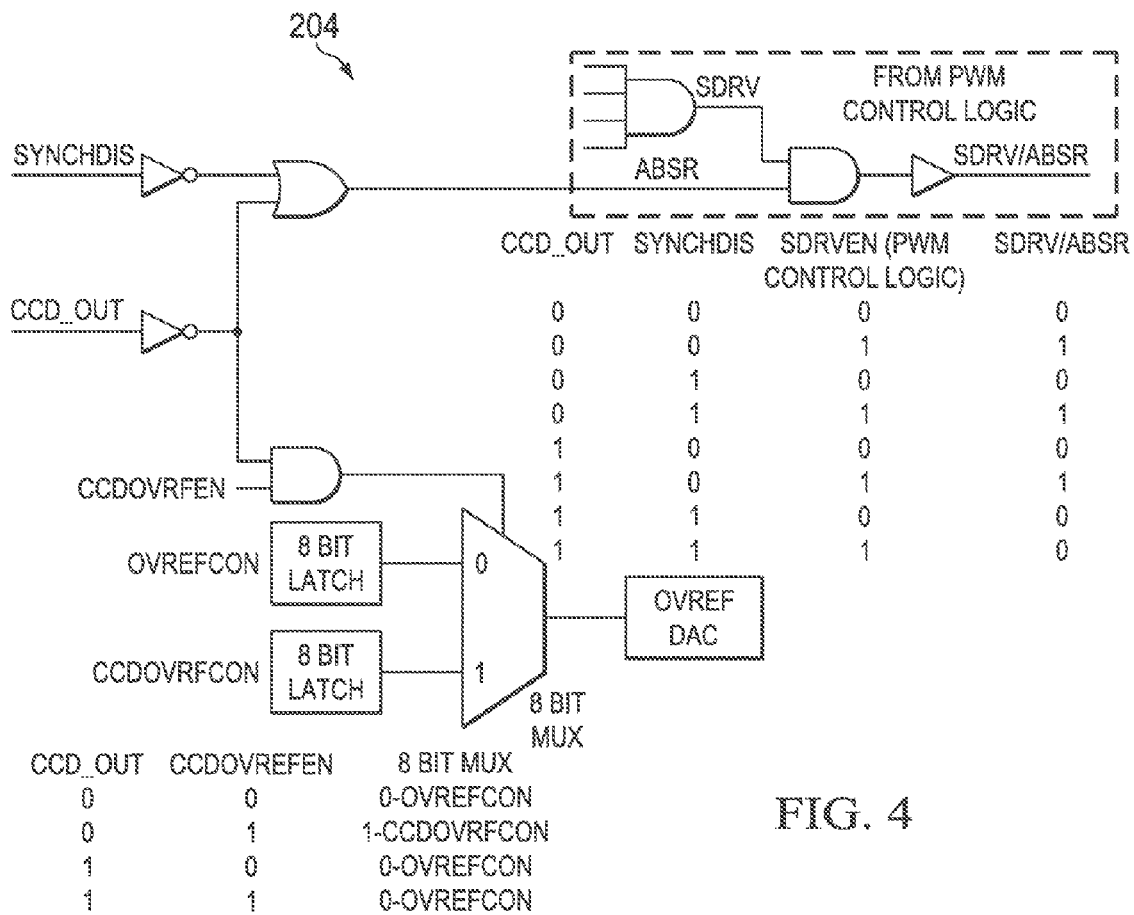
FIG. 4 illustrates a more detailed view of absorber logic and voltage reference selection logic, according to embodiments of the present disclosure.

FIG. 4 illustrates a more detailed view of absorber logic 204 and voltage reference selection logic 206, according to embodiments of the present disclosure.

In controller 102, the SDRV/ABS terminal may be the secondary driver output and therefore a shared driver and output pin. A SYNCHDIS (synch disable) bit may be provided. When this bit is cleared, the secondary driver may function as a synchronous secondary driver only. In such a mode, there might be no absorber function. When the SYNCHDIS bit is set and the CCD compare output is cleared, the synchronous secondary driver is enabled to operate as the ABSORBER function. In the ABSORBER mode, the driver controls a switch that applies a PWM for a load across the output. This pulsed load absorbs the energy from the charged output capacitance to lower the output voltage.

Similar to the synchronous secondary driver, the PWM may be controlled by the analog control loop. The ABSORBER function may be typically used when repositioning the output voltage down. Such a case may arise when changing from a higher forward voltage LED string to a lower forward voltage LED string, thus targeting the lower forward voltage LED string as the output voltage regulation set point level. Therefore, the voltage regulation portion of the dimming cycle only occurs while the CCD output is cleared and none of the CCD steering outputs are set. At such a portion of the dimming cycle, none of LED strings 106 might be energized.

When the CCD output is set and the SYNCHDIS bit is set, the ABSORBER function might be disabled. In such a case, one or more of LED strings 106 might be energized.

System 100 may be configured to automatically switch from one voltage regulation set point to another using VREF select logic 206. This may be an advantage for LED dimming with multiple strings while regulating regulates voltage and current. A CCDOVRFEN bit may be provided to allow the CCD output to toggle the voltage regulation set point between two or more values. For example, two values may be stored in 8-bit registers. When the CCD output is cleared, no LED string might be energized, meaning that the dimming cycle is in the voltage positioning portion of the cycle. When the CCD output gets set, the CCD steering bits in 202 may connect the desired string. This may further trigger the change for the voltage regulation set point to be moved to a value that adequately provides overvoltage protection in the event of an open load fault. This may provide open fault protection and allows the current regulation loop to take control.

The switching of voltage values may be accomplished by storing the voltage values in 8-bit latches, such as OVREFCON and CCDOVRFCON. These may be multiplexed according to the AND operation of CCDOVRFEN and the inverse of the CCD output. The digital result may be output by an OVREF digital-to-analog converter. When driving current, there is voltage regulation above the forward voltage of LED strings 106. OVREFCON, switched in with the other logic, may be the largest voltage potential of any strings. CCDOVERFCON may represent the actual voltage that is to be achieved, wherein the voltage is being moved up or down. The specific value of CCDOVERFCON may depend upon the particular one of LED strings 106 that is to be used. During a period in which LED strings 106 are not powered, the correct value of CCDOVERFCON for the next one of LED strings 106 may be switched in.

Logic state details are provided in truth tables in FIG. 4.

The PWM control logic may include input voltage protection, for both over and under-voltage values. If such limits are exceeded, then the control logic may disable the secondary drive or absorption. One or more such protections may be passed through an AND gate with other components of secondary drive.

Figure 5:
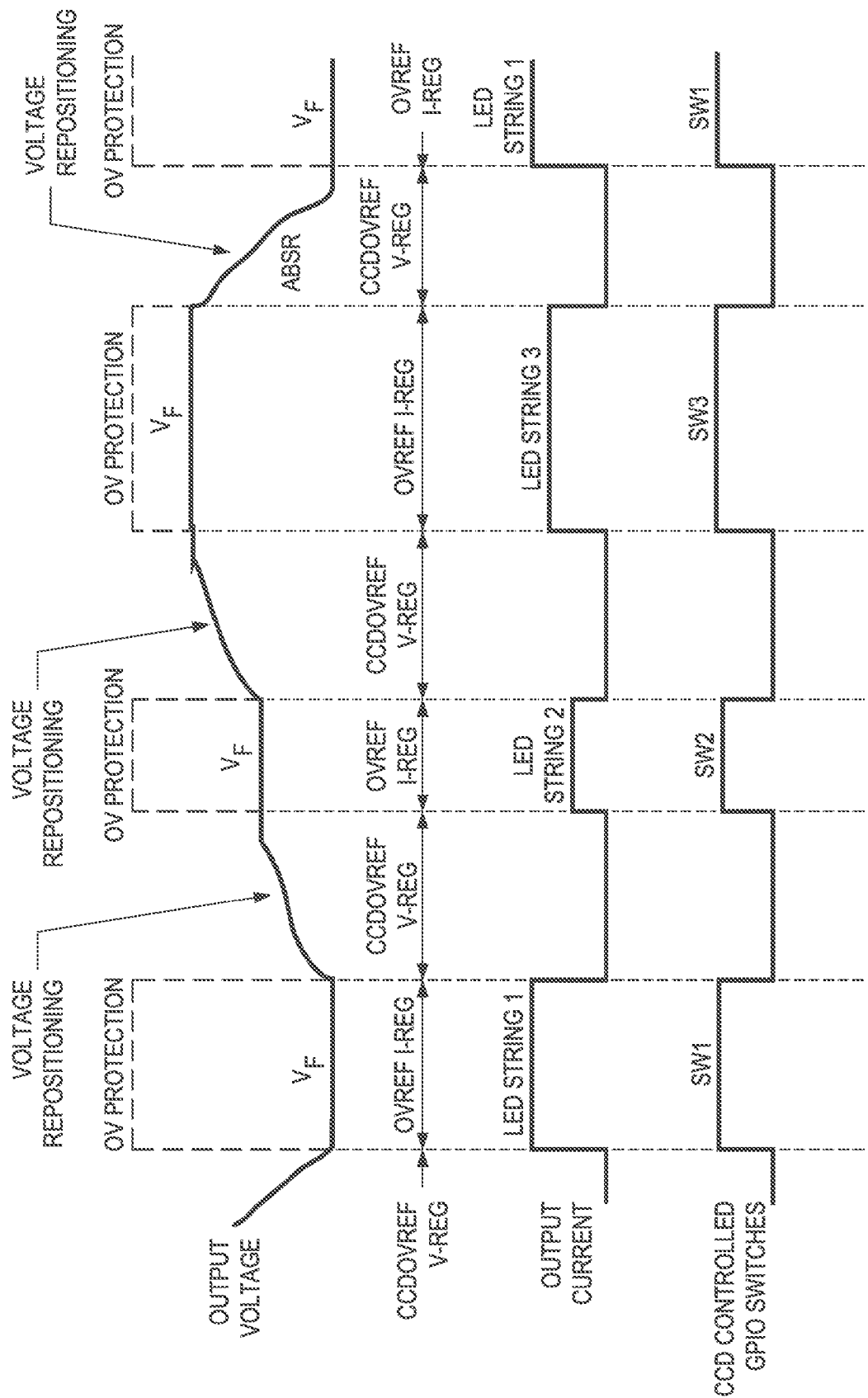
FIG. 5 illustrates a timing diagram with various signals of the circuit, according to embodiments of the present disclosure.

FIG. 5 illustrates a timing diagram with various signals of the circuit, according to embodiments of the present disclosure.

CCD controlled GPIO switches may be enabled for various ones of SW1-SW3 in subsequent fashion in a given single cycle. The width of each such enable signal may reflect the duty cycle for PWM powering of ones of LED strings 106.

Above the switch entry, corresponding output currents are shown. The output currents may vary according to the currents produced for each such LED string 106 and may be dictated by repositioned voltages and the elements of respective LED strings 106.

The output voltage may vary between different LED strings 106. The voltage needed for each LED string 106 in the example of FIG. 1 may be progressively higher than the previous string, as each string includes more LEDs. Accordingly, during a given cycle, the output voltage may rise as the LED string 106 associated with SW1 is enabled, followed by the LED string 106 associated with SW2, and followed by the LED string 106 associated with SW3. In between the powering of each of LED strings 106, the output voltage may rise during voltage repositioning to the next level. Such desired output voltages may be loaded into the latches of FIG. 4 in turn as the next of LED strings 106 is to be powered. When the last of LED strings 106 has been powered in the given cycle and the output voltage is to drop to the value of voltage needed by the LED string 106 associated with SW1, then the voltage may be absorbed.

Each voltage repositioning and absorption period may be performed when the CCD is not outputting and when the CCDOVERREFEN bit is set.

The invention claimed is:

1. An integrated circuit device configured to drive multiple LED strings, the device comprising:
   a switch mode power supply (SMPS) control circuit configured to generate primary and secondary power transistor control signals and receive at least one current sense signal and an output voltage sense signal;
   an output compare circuit configured to generate a plurality of pulse width modulated signals; and
   a logic circuit configured to generate signals for selecting a reference voltage and for activating an absorber mode;
   wherein:
      the signal for activating an absorber mode is configured to be shared with the secondary power transistor control signal; and
      the logic circuit is configured to be synchronized with the output compare circuit.

2. The integrated circuit device of claim 1, wherein the signal for activating an absorber mode overwrites the secondary power transistor control signal.

3. The integrated circuit device of claim 1, further comprising a digital to analog converter configured to receive the signals for selecting the reference voltage.

4. The integrated circuit device of claim 1, wherein the SMPS control circuit is further configured to generate the primary and secondary power transistor control signals to reposition voltage during a portion of a dimming cycle of the LED strings in which the LED strings are turned off.

5. The integrated circuit device of claim 1, wherein the SMPS control circuit is further configured to generate the primary and secondary power transistor control signals to reposition voltage to a voltage level matching a voltage of a next LED string to be activated during a portion of a dimming cycle of the LED strings in which the LED strings are turned off.

6. The integrated circuit device of claim 1, wherein the SMPS control circuit is further configured to generate the primary and secondary power transistor control signals to absorb voltage to lower output voltage to a voltage level matching a voltage of a next LED string to be activated during a portion of a dimming cycle of the LED strings in which the LED strings are turned off.

7. The integrated circuit device of claim 1, wherein the SMPS control circuit is further configured to generate the primary and secondary power transistor control signals to absorb or reposition output voltage during a portion of a dimming cycle of the LED strings in which the LED strings are turned off based upon the logic circuit.

8. The integrated circuit device of claim 1, wherein the logic circuit is further configured to alternately select the reference voltage from a overprotection voltage value and a candidate LED string voltage value, the candidate LED string voltage value corresponds to a next LED string voltage to be powered during a dimming cycle.

9. The integrated circuit device of claim 1, wherein during a dimming cycle the logic circuit is further configured to alternately select the reference voltage from an overprotection voltage value and from a plurality of LED string voltages.

10. A system configured to drive multiple LED strings, the system comprising:
    a SMPS control circuit configured to generate primary and secondary power transistor control signals and receive at least one current sense signal and an output voltage sense signal;
    an output compare circuit configured to generate a plurality of pulse width modulated signals; and
    a logic circuit configured to generate signals for selecting a reference voltage and for activating an absorber mode;
    wherein:
       the signal for activating an absorber mode is configured to be shared with the secondary power transistor control signal; and
       the logic circuit is configured to be synchronized with the output compare circuit.

11. The system of claim 10, wherein the signal for activating an absorber mode overwrites the secondary power transistor control signal.

12. The system of claim 10, further comprising a digital to analog converter configured to receive the signals for selecting the reference voltage.

13. The system of claim 10, wherein the SMPS control circuit is further configured to generate the primary and secondary power transistor control signals to reposition voltage during a portion of a dimming cycle of the LED strings in which the LED strings are turned off.

14. The system of claim 10, wherein the SMPS control circuit is further configured to generate the primary and secondary power transistor control signals to reposition voltage to a voltage level matching a voltage of a next LED string to be activated during a portion of a dimming cycle of the LED strings in which the LED strings are turned off.

15. The system of claim 10, wherein the SMPS control circuit is further configured to generate the primary and secondary power transistor control signals to absorb voltage to lower output voltage to a voltage level matching a voltage of a next LED string to be activated during a portion of a dimming cycle of the LED strings in which the LED strings are turned off.

16. The system of claim 10, wherein the SMPS control circuit is further configured to generate the primary and secondary power transistor control signals to absorb or reposition output voltage during a portion of a dimming cycle of the LED strings in which the LED strings are turned off based upon the logic circuit.

17. The system of claim 10, wherein the logic circuit is further configured to alternately select the reference voltage from a overprotection voltage value and a candidate LED string voltage value, the candidate LED string voltage value corresponds to a next LED string voltage to be powered during a dimming cycle.

18. The system of claim 10, wherein during a dimming cycle the logic circuit is further configured to alternately select the reference voltage from an overprotection voltage value and from a plurality of LED string voltages.

19. The system of claim 10, further comprising:
    a SMPS circuit coupled with the SMPS control circuit, the SMPS circuit comprising a primary filed effect transistor and a secondary field effect transistor that couples a shunt resistor connected with the output voltage of the SMPS circuit with ground; and a plurality of LED strings coupled with an output of the SMPS circuit.

20. The system of claim 10, further comprising a plurality of field effect transistors each associated with one of the LED strings and controlled by one of the plurality of pulse width modulated signals.

\* \* \* \* \*